March 1, 1966
K. W. KAMPERT ET AL
3,237,790
ARTICULATED FOUR-WHEEL DRIVE EARTHWORKING VEHICLE
Filed June 14, 1963
2 Sheets-Sheet 1
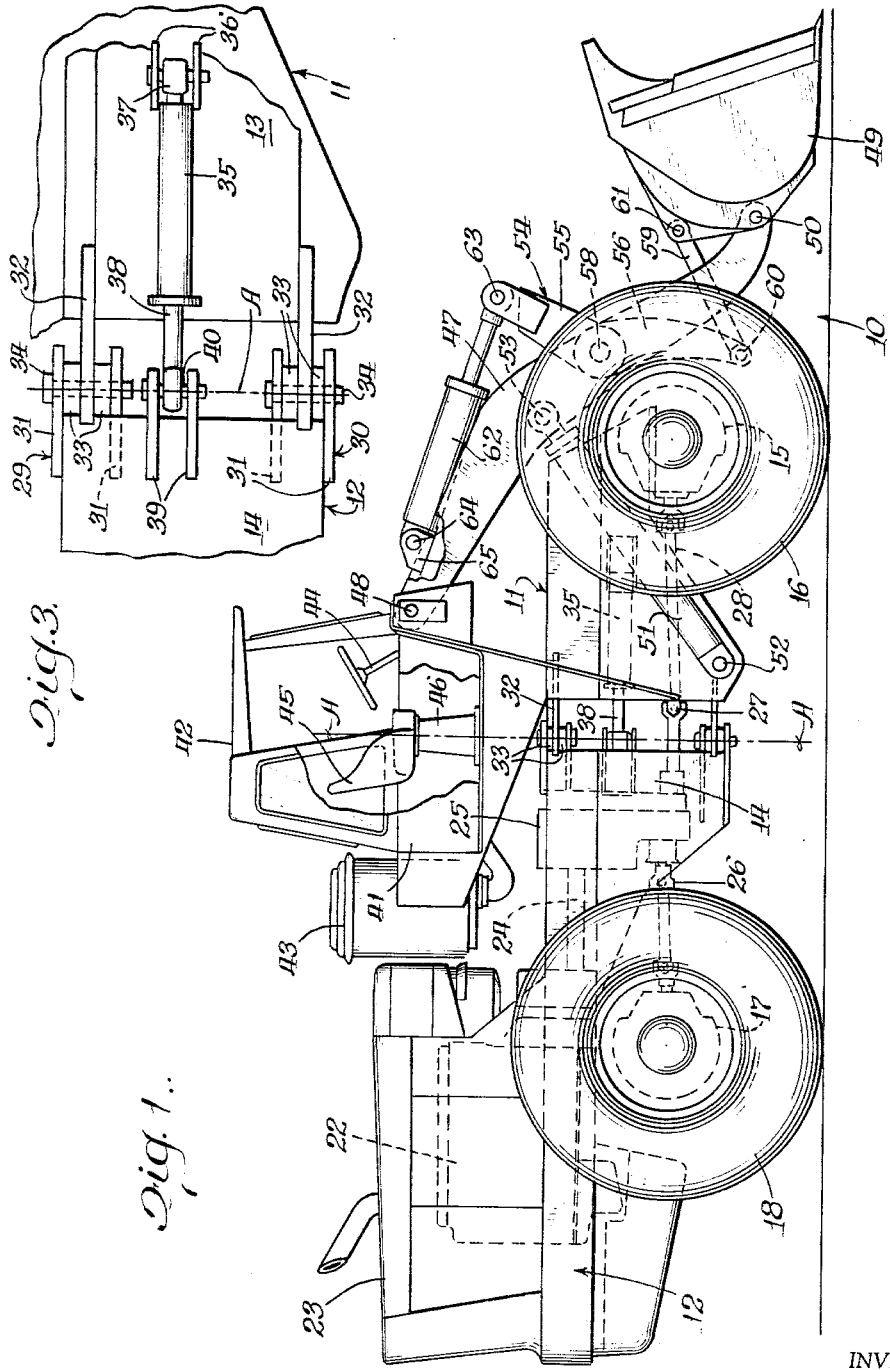
INVENTOR.
Keith W. Kampert
Richard F. Zimmerman
By Edmund O. Vogel
Atty.

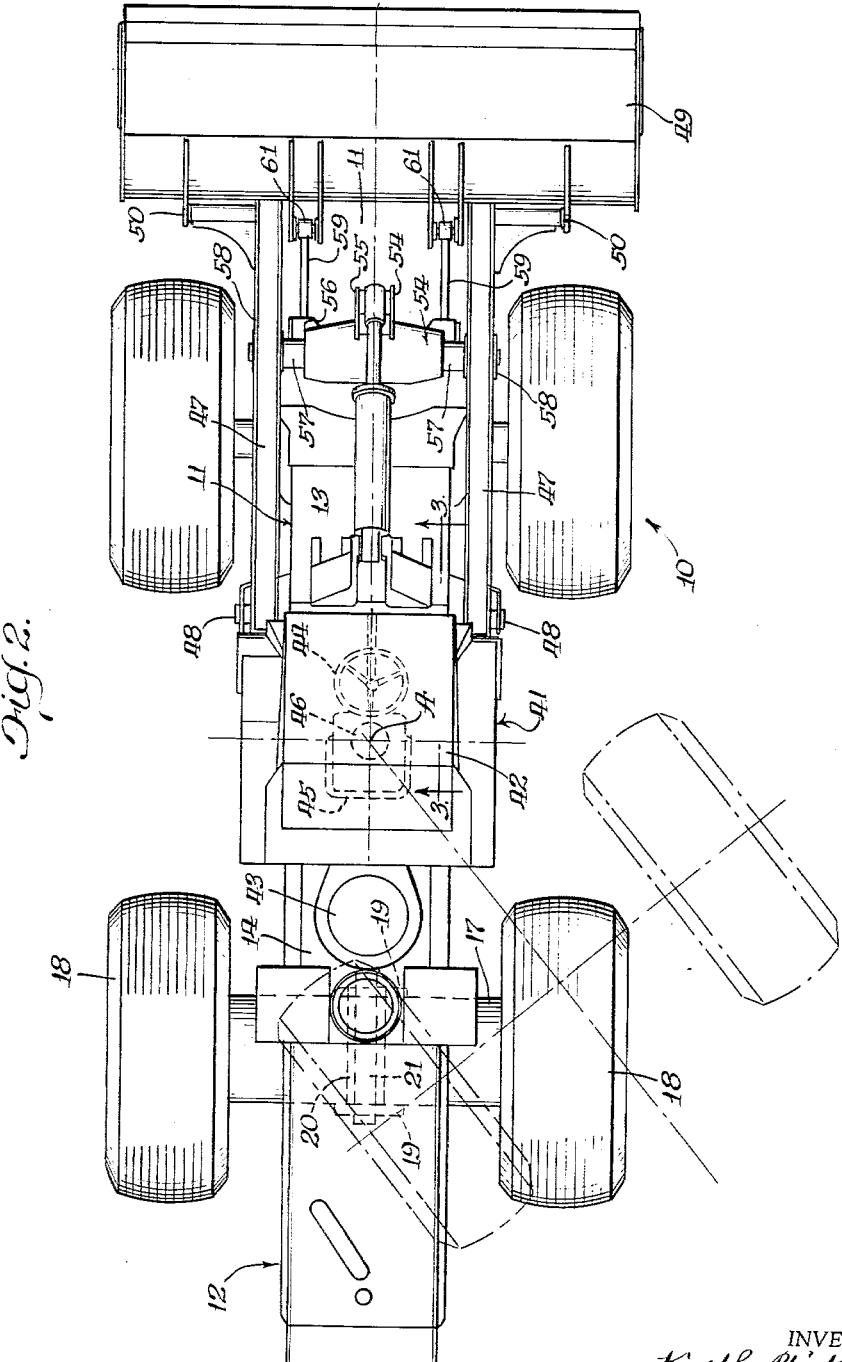

United States Patent Office 3,237,790
Patented Mar. 1, 1966

3,237,790
ARTICULATED FOUR-WHEEL DRIVE
EARTHWORKING VEHICLE
Keith W. Kampert, Libertyville, and Richard F. Zimmerman, Waukegan, Ill., assignors to The Frank G. Hough Co., a corporation of Illinois
Filed June 14, 1963, Ser. No. 287,935
5 Claims. (Cl. 214—132)

This invention relates generally to earthmoving vehicles, and more particularly to an articulated vehicle having in combination therewith a loader, bulldozer, or similar earthmoving implement.

The articulated type of earthmoving vehicle comprises generally a front and rear frame which are hingedly connected together for relative angular movement about a vertical pivot axis. Such a vehicle is generally of four-wheel drive construction and the angular movement of the frames to effect steering is accomplished by fluid extensible rams interconnecting the front and rear frames of the vehicle. In certain of the conventional articulated earthmovers the engine is mounted on the rear frame, the loader bucket or bulldozer being connected to the front frame by a pair of forwardly extending support arms which are pivotally connected to said front frame. In certain of the conventional articulated vehicles, either the front axle or the rear axle of the vehicle is connected respectively to the front or rear frame of the tractor for oscillatory movement about a horizontal, longitudinal pivot axis. Some of the conventional vehicles have the operator station positioned on the rear frame whereas others have the operator station positioned on the front frame.

When the operator station is pivoted on the rear frame visibility is generally very poor since the operator has great difficulty in observing the engagement of the implement with the material to be moved. On the other hand, if the operator station is positioned on the front frame the operator is usually in a position wherein he is disposed substantially forwardly of the vertical pivot axis and moves with the front frame relative to the rear frame during steering operation. This swinging movement of the operator is undesirable both from the standpoint of physical discomfort and also from the psychological steering sense which places him in an offset relation with respect to the central vertical pivot axis of the unit. His accurate control of the vehicle is greatly lessened when placed in this position since the steering feel in the forward position is unreal and lessens the chance of accurate steering judgment. Further, when the operator is positioned rearwardly of the vertical pivot axis a similar condition occurs since again physically the operator is displaced in an angular relation each time that the two frames are placed in a relative angular position with respect to each other. Therefore, it is a prime object of this invention to provide an improved articulated earthmoving vehicle wherein the operator during steering movement is placed in the most advantageous position from the standpoint of steering and observation of the ground-digging operation of his implement.

Still another object is to provide an articulated earthmoving vehicle wherein steering of the vehicle is effected by relative angular movement of a forward and rearward frame about a vertical pivot axis and wherein the operator's seat is disposed directly over said vertical pivot axis and remains so positioned during all turning movements of the vehicle.

More specific objects will become readily apparent from a reading of the description when examined in connection with the accompanying sheets of drawings.

In the drawings:
FIGURE 1 is a side elevational view of an articulated ground moving vehicle having portions of the view broken away to show the interior of an operator's cab;
FIGURE 2 is a plan view of the vehicle shown in FIGURE 1; and
FIGURE 3 is a fragmentary cross-sectional view substantially along the line 3—3 of FIGURE 2.

Referring now particularly to FIGURES 1 and 2, a four-wheel drive earthmoving vehicle is generally designated by the reference character 10. The vehicle comprises a front frame 11 and a rear frame 12 which respectively include horizontal frame portions 13 and 14. The vehicle 10 is of the four-wheel drive type and includes a front drive axle structure 15 adapted to drive front drive wheel 16. The axle structure 15 is suitably rigidly secured to the front frame 11.

The rear frame 12 is supported by a rear drive axle structure 17 adapted to suitably drive rear drive wheels 18. A pair of brackets 19 longitudinally spaced on the longitudinal center line of the vehicle, as best shown in FIGURE 2, are supported on the rear frame 12 and project downwardly with respect thereto. A longitudinal bearing structure 20 is disposed between the brackets 19 and is hingedly connected thereto by means of a horizontal pivot member 21. The bearing structure is rigidly connected to the rear drive axle structure 17 and permits the same to oscillate about the horizontal pivot member 21.

A power unit 22 is supported on the rear frame 12 and is suitably enclosed by means of a hood and radiator assembly 23. The power unit 22, by means of a drive shaft 24, drives a suitable gear train (not shown) provided in a transmission transfer case 25 also supported on the rear frame 12. A universal drive connection 26 from the transmission case 25 imparts driving torque to the rear axle structure 17. Another universal drive connection 27 extends forwardly from the transmission case 25 to a universal drive connection 28 which imparts driving torque to the front drive axle structure 15.

The vehicle 10 is of the articulated type in that the frames 11 and 12 are hingedly connected together for angular or pivotal movement about a vertical pivot axis designated by the letter "A." Steering of this articulated vehicle is accomplished by pivoting the frames about the pivot axis A by power actuators disposed and connected between the front and rear frames. The steering mechanism for the vehicle 10 comprises upper and lower brackets 29 and 30 best shown in FIGURE 3. The brackets 29 and 30 are disposed on the longitudinal center line of the tractor and each include two substantially parallel and horizontally extending plates 31 which are suitably connected to the frame portion 14 and extend forwardly with respect thereto. Upper and lower plates or brackets 32 also are disposed on the longitudinal center line of the vehicle and are suitably connected to the front frame 11 and extend rearwardly from the frame portion 13 between the plates 31 of the brackets 29 and 30. The plates 31 and 32 are provided with suitable holes in alignment and which also are in registry with spacers 33. Pivot pins 34 pivotally connect the brackets 31 and 32 and spacers 33. Thus the line indicated by the letter A is the vertical pivot axis which extends through the pins 34 connecting the brackets 29 and 30 to the plates 32. As best shown in FIGURE 3, a fluid ram 35 is connected to brackets 36 on one side of the frame portion 13. The ram 35 is connected to brackets 36 about a vertical pivot means 37. The ram 35 further includes an extensible rod 38 suitably connected between plates 39 by pivot means 40. The plates 39 are disposed and connected to the frame portion 14 at the right-hand outer end of the said frame portion 13. Another set of plates 39 is similarly disposed on the outer left-hand side of the frame portion 14. Another ram 35 and associated parts is disposed and connected to these other plates 39 on the left-hand side, the said side not being shown but being identical in construction to the side shown in FIGURE 3.

The frame 11 is provided with a rear extension designated at 41, the said extension 41 being disposed above the steering pivot pins 34. The extension 41 suitably supports an operator station 42 having connected at its rear end a hydraulic tank 43. The operator station 42 may be of conventional sheet metal construction and the details of the same need not be further described. The operator's station includes a steering wheel 44 which, by means of suitable hydraulic connections not shown, actuates the steering rams 35 for extending the rod 38 of one and retracting the rod 38 of the other to provide for steering or angular movement of the forward frame 11 relative to the rear frame 12 as is conventional in the art. The operator station also may include further controls for other components of the vehicle, these controls not being shown.

An operator's seat is designated at 45 and includes a pedestal 46. The operator's seat 45 is disposed in substantial alignment with the pivot axis A so that the operator seated upon said operator's seat 45 is disposed substantially above and in alignment with the vertical pivot axis A. While the pedestal 46 is shown as being concentric with the pivot axis A, this of course need not be the case and the primary purpose is to place the seat 45 itself in substantial concentric alignment with the pivot axis A.

The vehicle 10 further comprises a pair of forwardly extending implement support rams 47 suitably connected to the forward frame 11 as indicated at 48. A bucket 49 is pivotally connected to the forward ends of the support arms 47 by means of a pivot structure designated at 50 and best shown in FIGURE 2. Suitable fluid extensible rams 51 are pivotally connected on opposite sides of the frame 11 and have their opposite ends pivotally connected to the arms 47 as indicated at 53. Thus upon extension and retraction of the rams 51 the support arms 47 and bucket 49 may be raised and lowered as desired. A pivot fork is designated generally at 54 and includes an upwardly extending arm 55 and a pair of transversely spaced downwardly extending arms 56. The pivot fork 54 is suitably journaled on the support arms 47 by means of pivot shafts 57 pivoted as indicated at 58. A pair of links 59 are pivotally connected as indicated at 60 to the arms 56, the said links 59 extending forwardly and being connected to the rear of the shovel 49 as indicated at 61. A fluid extensible ram 62 has one end portion pivotally connected, as indicated at 63, to the arm 55, the said ram 62 having its other end pivotally connected as indicated at 64 to a bracket 65 which is centrally supported on an upper portion of the front frame 11.

In the operation, the raising of the shovel 49 is accomplished by the extension of the rams 51. The shovel during raising may be retained in a level position by means of the linkage construction afforded by the links 59, arms 56, arms 55, and ram 62. Breakout of the shovel 49 and also dumping is achieved by the actuation of the ram 62 in conventional fashion.

As the operator is positioned, by means of the extension 41, directly over the vertical pivot axis A he remains on this pivot axis during all turning movement of the frames or, in other words, during any angulation of the frames 11 and 12, he at all times is still seated over the pivot axis A. Thus he does not swing from one side to the other side of the vehicle during steering movement as is the case in conventional vehicles. As shown in FIGURE 2, for instance, in the dotted line position of the rear wheels the operator may still be seated directly over the axis A in the same position on the front frame 11 as afforded by the frame extension 41. The operator thus does not swing from one side to the other as would be the case if he were seated on the rear frame rearwardly of the pivot axis A. In the position shown, the operator has a completely unobstructed view of the engagement of the bucket with the ground and therefore has excellent visibility. The fatigue on the operator is greatly diminished by the position of his seat since he is directly above or in vertical alignment with the pivot axis A and remains in that position despite the turning movement of the frames. His ability and coordination in steering is greatly improved by this particular position of the operator's seat.

Thus it is believed that the objects of the invention have been fully achieved and that an improved earthmoving vehicle has been described. It must be understood that changes and modifications may be made in the invention without departing from the spirit of the invention as disclosed, or from the scope thereof as defined in the appended claims.

What is claimed is:
1. A four-wheel drive earthmoving vehicle comprising
 (a) a front frame,
 (b) a front driving axle structure supporting said front frame,
 (c) a rear frame,
 (d) a rear driving axle structure supporting said rear frame,
 (e) means interconnecting said rear frame with said rear driving axle structure whereby said rear axle structure and said rear frame may oscillate relatively about a horizontal longitudinal axis,
 (f) a power unit carried on said rear frame,
 (g) transmission means supported on said rear frame and connected to said power unit to be driven thereby,
 (h) driving means from said transmission means connected to said driving axle structures,
 (i) hinge means positioned between said front and rear frames including upper and lower pivot brackets respectively on said frames,
 (j) hinge pin means interconnecting said brackets to provide a vertical pivot axis whereby said frames may be moved relatively to angled positions about said vertical pivot axis,
 (k) fluid rams interconnecting said frames for relatively moving said frames about said vertical pivot axis to effectuate steering of said vehicle,
 (l) a frame extension on said front frame extending horizontally rearwardly of said pivot axis,
 (m) an operator station supported on said frame extension,
 (n) an operator's seat on said station, said operator's seat being positioned substantially over said hinge means and in alignment with said vertical pivot axis,
 (o) whereby the operator seated on said seat is disposed over said pivot axis during all relatively angled positions of said frames,
 (p) support arms pivotally carried on said front frame and extending forwardly with respect thereto,
 (q) an earthmoving implement connected to said support arms to be raised and lowered therewith, and
 (r) means connected to said front frame and said support arms for raising and lowering the same.
2. A four-wheel drive earthmoving vehicle comprising
 (a) a front frame,
 (b) a front driving axle structure supporting said front frame,
 (c) a rear frame,
 (d) a rear driving axle structure supporting said rear frame,
 (e) a power unit carried on said rear frame,
 (f) transmission means sunpported on said rear frame and connected to said power unit to be driven thereby,
 (g) driving means from said transmission means connected to said driving axle structures,

(h) hinge means positioned between said front and rear frames including upper and lower pivot brackets respectively on said frames,
(i) hinge pin means interconnecting said brackets to provide a vertical pivot axis whereby said frames may be moved relatively to angled positions about said vertical pivot axis,
(j) steering means interconnecting said frames for relatively moving said frames about said vertical pivot axis to effectuate steering of said vehicle,
(k) a frame extension on said front frame extending horizontally rearwardly of said pivot axis,
(l) an operator station supported on said frame extension,
(m) an operator's seat on said station, said operator's seat being positioned substantially over said hinge means and in alignment with said vertical pivot axis,
(n) whereby the operator seated on said seat is disposed over said pivot axis during relatively angled positions of said frames,
(o) support arms pivotally carried on said front frame and extending forwardly with respect thereto,
(p) an earthmoving implement connected to said support arms to be raised and lowered therewith, and
(q) means connected to said front frame and said support arms for raising and lowering the same.

3. A four-wheel drive earthmoving vehicle comprising
(a) a front frame,
(b) a front driving axle structure supporting said front frame,
(c) a rear frame,
(d) a rear driving axle structure supporting said rear frame,
(e) a power unit carried on one of said frames,
(f) transmission means supported on one of said frames and connected to said power unit to be driven thereby,
(g) driving means from said transmission means connected to said driving axle structure,
(h) hinge means positioned between said front and rear frames including upper and lower pivot brackets respectively on said frames,
(i) hinge pin means interconnecting said brackets to provide a vertical pivot axis whereby said frames may be moved relatively to angled positions about said vertical pivot axis,
(j) fluid rams interconnecting said frames for relatively moving said frames about said vertical pivot axis to effectuate steering of said vehicle,
(k) a frame extension on said front frame extending horizontally rearwardly of said pivot axis,
(l) an opertator station supported on said frame extension, and
(m) an operator's seat on said station, said operator's seat being positioned substantially over said hinge means and in alignment with said vertical pivot axis,
(n) whereby the operator seated on said seat is disposed over said pivot axis during all relatively angled positions of said frames.

4. An earthmoving vehicle comprising
(a) a front frame including ground wheels,
(b) a rear frame including driven wheels,
(c) a power unit supported on one of said frames for driving said driven wheels,
(d) means hingedly interconnecting said front and rear frames about a vertical pivot axis whereby said frames may be relatively moved to a plurality of angled steering positions,
(e) means interconnecting said frames for moving the same about said pivot axis,
(f) an extension on said front frame extending horizontally rearwardly of said pivot axis,
(g) an operator's station supported on said extension above said pivot axis,
(h) an operator's seat on said station,
(i) said seat being disposed in substantial vertical alignment with said pivot axis whereby during steering an operator remains disposed over said pivot axis,
(j) and earthmoving implement means connected to said front frame forwardly of said operator's station,
(k) and ram means connected to said front frame and to said implement means for raising and lowering the same.

5. An earthmoving vehicle comprising
(a) a front frame including ground wheels,
(b) a rear frame including ground wheels,
(c) a power unit supported on one of said frames for driving said ground wheels,
(d) means hingedly interconnecting said front and rear frames about a vertical pivot axis whereby said frames may be relatively moved to a plurality of angled steering positions,
(e) hydraulic ram means interconnecting said frames for moving the same about said pivot axis,
(f) an extension on said front frame extending horizontally rearwardly of said pivot axis,
(g) an operator's station supported on said extension above said pivot axis,
(h) an operator's seat on said station,
(i) said seat being disposed in substantial vertical alignment with said pivot axis whereby during steering an operator remains disposed over said pivot axis,
(j) earthmoving implement means connected to said front frame forwardly of said operator's station,
(k) and ram means connected to said front frame and to said implement means for raising and lowering the same.

References Cited by the Examiner

UNITED STATES PATENTS

| | | | |
|---|---|---|---|
| 1,186,340 | 6/1916 | Senderling | 180—51 |
| 2,827,715 | 3/1958 | Wagner | 37—117.5 |
| 2,835,397 | 5/1958 | Wagner | 214—140 |
| 3,007,590 | 11/1961 | Mathew et al. | 214—140 |

HUGO O. SCHULZ, *Primary Examiner.*